United States Patent
Riddle (10) Patent No.: US 9,794,127 B2
(45) Date of Patent: *Oct. 17, 2017

(54) VIRTUAL BANDWIDTH MANAGEMENT DEPLOYMENT ARCHITECTURES

(71) Applicant: SYMANTEC CORPORATION, Mountain View, CA (US)

(72) Inventor: Guy Riddle, Los Gatos, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/179,528

(22) Filed: Jun. 10, 2016

(65) Prior Publication Data

US 2016/0294628 A1 Oct. 6, 2016

Related U.S. Application Data (63) Continuation of application No. 12/050,316, filed on Mar. 18, 2008, now Pat. No. 9,391,921.

(51) Int. Cl.
| | |
|---|---|
| *H04L 12/911* | (2013.01) |
| *H04L 12/24* | (2006.01) |
| *H04L 12/26* | (2006.01) |
| *H04W 84/12* | (2009.01) |

(52) U.S. Cl.
CPC ...... *H04L 41/0896* (2013.01); *H04L 41/0893* (2013.01); *H04L 43/0894* (2013.01); *H04L 47/78* (2013.01); *H04L 47/783* (2013.01); *H04L 47/821* (2013.01); *H04J 2203/0067* (2013.01); *H04W 84/12* (2013.01)

(58) Field of Classification Search
CPC ... H04L 12/5695; H04L 47/74; H04L 47/821; H04L 47/805; H04L 47/783; H04L 41/0893

See application file for complete search history.

(56) References Cited

U.S. PATENT DOCUMENTS

| | | |
|---|---|---|
| 5,802,106 A | 9/1998 | Packer |
| 6,011,776 A | 1/2000 | Berthaud et al. |
| 6,018,516 A | 1/2000 | Packer |
| 6,038,216 A | 3/2000 | Packer |
| 6,046,980 A | 4/2000 | Packer |
| 6,115,357 A | 9/2000 | Packer et al. |
| 6,128,713 A | 10/2000 | Elster et al. |
| 6,154,776 A | 11/2000 | Martin |
| 6,195,362 B1 | 2/2001 | Darcie et al. |
| 6,366,945 B1 | 4/2002 | Fong et al. |
| 6,490,249 B1 | 12/2002 | Aboul-Madg et al. |
| 6,546,415 B1 | 4/2003 | Park |
| 6,771,661 B1 | 8/2004 | Chawla et al. |
| 6,952,735 B1 | 10/2005 | Aune |
| 6,968,323 B1 | 11/2005 | Bansal et al. |
| 7,366,101 B1 | 4/2008 | Varier et al. |
| 7,599,283 B1 | 10/2009 | Varier et al. |
| 2002/0167960 A1 | 11/2002 | Garcia-Luna-Aceves |
| 2002/0194326 A1 | 12/2002 | Gold et al. |

(Continued)

*Primary Examiner* — Omer S Mian
(74) *Attorney, Agent, or Firm* — Maschoff Brennan (57) ABSTRACT

Control and management of bandwidth at networks remote from the physical bandwidth management infrastructure. Particular implementations allow network equipment at a plurality of data centers, for example, to manage network traffic at remote branch office networks without deployment of network devices at the remote branch office networks.

30 Claims, 5 Drawing Sheets

(56) References Cited

U.S. PATENT DOCUMENTS

2003/0043792 A1 3/2003 Carpini et al.
2007/0121503 A1 5/2007 Guo et al.
2009/0028161 A1 1/2009 Fullarton et al.

FIG._6

VIRTUAL BANDWIDTH MANAGEMENT DEPLOYMENT ARCHITECTURES

CROSS-REFERENCE TO RELATED APPLICATIONS

This application is a continuation of U.S. application Ser. No. 12/050,316 filed Mar. 18, 2008 and entitled "Virtual Bandwidth Management Deployment Architectures."

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;" and U.S. patent application Ser. No. 09/106,924 now U.S. Pat. No. 6,115,357, in the name of Robert L. Packer and Brett D. Galloway, entitled "Method for Pacing Data Flow in a Packet-based Network."

TECHNICAL FIELD

The present disclosure relates to management and control of network bandwidth and, more particularly, to management and control of network bandwidth at networks remote from the physical bandwidth management infrastructure.

BACKGROUND

Businesses are growing increasingly dependent on distributed computing environments and wide area computer networks to accomplish critical tasks. Indeed, a wide variety of business applications are deployed across intranet, extranet and Internet connections to effect essential communications with workers, business partners and customers. As the number of users, applications and external traffic increases, however, network congestion forms, impairing business application performance. Enterprise network managers, therefore, are constantly challenged with determining the volume, origin and nature of network traffic to align network resources with business priorities and applications.

A common enterprise network may comprise one or more data centers and a plurality of branch office networks interconnected by public, private and/or leased network communication paths. A data center is a facility used to house computer systems and associated components, such as telecommunications and storage systems. It generally includes redundant or backup power supplies, redundant data communications connections, environmental controls (e.g., air conditioning, fire suppression), and special security devices. Branch office networks typically interconnect to the data centers of an enterprise using virtual private network (VPN) technology, such as VPN servers over the public internet or through Multiprotocol Label Switching (MPLS) VPNs, which use a network infrastructure provided by an Internet Protocol (IP) MPLS/Boarder Gateway Protocol (BGP) based network. In many enterprise network deployments, network traffic associated with branch office networks typically flows through the data center network, which hosts the firewall and other security functions of the enterprise.

SUMMARY

In particular embodiments, the present invention provides methods, apparatuses, and systems directed to control and management of bandwidth at networks remote from the physical bandwidth management infrastructure. Particular implementations allow network equipment at a plurality of data centers, for example, to manage network traffic at remote branch office networks without deployment of network devices at the remote branch office networks.

DESCRIPTION OF EXAMPLE EMBODIMENT(S)

The following example embodiments are described and illustrated in conjunction with apparatuses, methods, and systems which are meant to be examples and illustrative, not limiting in scope.

A. Network Environment

Figure 1:
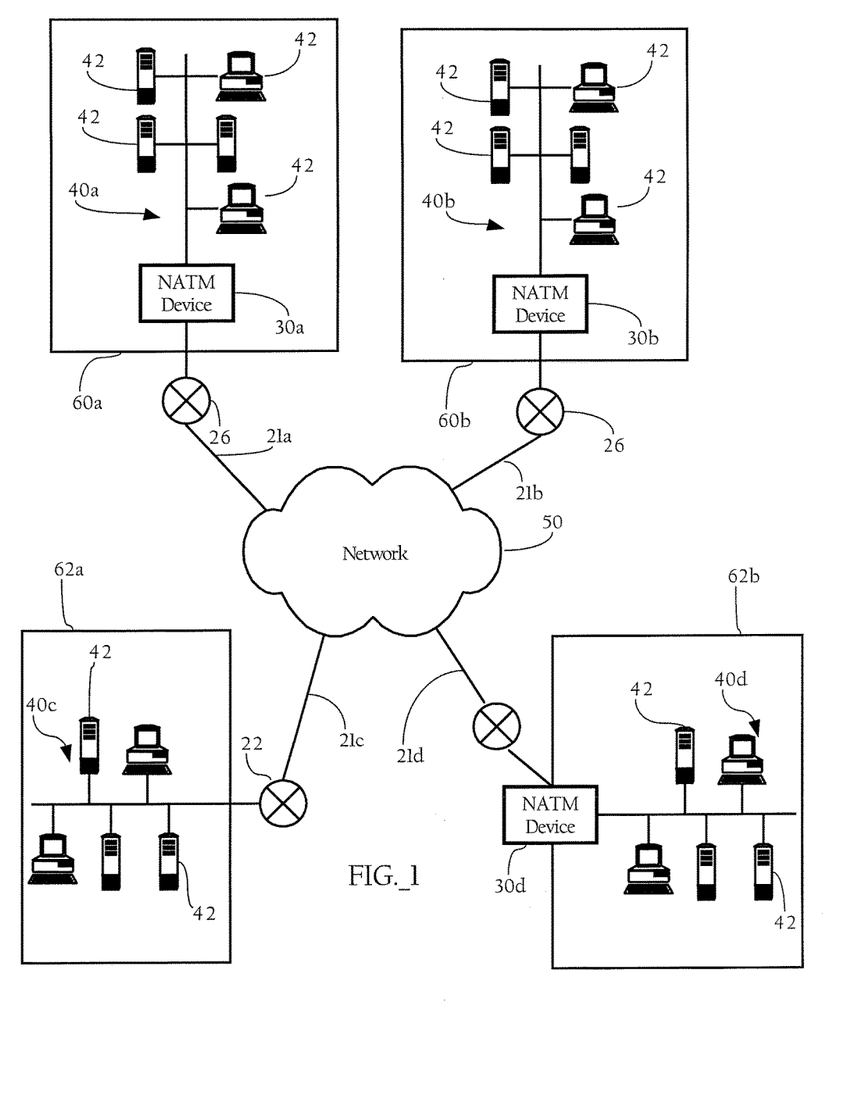
FIG. 1 is a functional block diagram illustrating an example network environment.

FIG. 1 illustrates, for didactic purposes, a network 50, such as wide area network, interconnecting a plurality of network sites including first and second data centers 60a and 60b, and first and second branch offices 62a and 62b. In a particular implementation, first and second data centers 60a and 60b, and first and second branch offices 62a and 62b are within a single administrative domain. In the implementation shown, each of the network sites includes one or more Local Area Networks (LANs) 40a, 40b, 40c and 40d. First data center 60a may correspond to a central operating or headquarters facility (for example), while second data center 60b may correspond to a back up facility or a second operating facility. LANs 40a, 40b, 40c and 40d may be wired (e.g., Ethernet) or wireless (e.g., IEEE 802.11) networks or network segments. In one implementation, network 50 may be a public network, a private network or a virtual private network. Network 50 may include an MPLS VPN network core interconnecting the network sites. Network 50 may also be operably connected to other networks associated with the same administrative domain as the network sites 60a, 60b, 62a and 62b, or a different administrative domain. Furthermore, network 50 may allow access to a variety of hosts over the Internet, as well. In this description, the use of a reference number, such as 60, without a letter (e.g., 60a) is intended to refer to all instances of a given element to which the reference number corresponds.

As FIG. 1 shows, the LANs 40a, 40b, 40c and 40d each interconnect several hosts or end systems 42, including personal computers and servers, and provides access to resources operably connected to computer network 50 via router 26 and access link 21. Access link 21 is a physical and/or logical connection between two networks, such as computer network 50 and network 40a. The computer network environment, including network 40a and network 50 is a packet-based communications environment, employing Transport Control Protocol/Internet Protocol (TCP/IP) protocols (for example), and/or other suitable protocols, and has a plurality of interconnected digital packet transmission stations or routing nodes. For didactic purposes, assume that the network environment illustrated above has been configured in a modified hub-and-spoke topology where first and second data centers 60a and 60b essentially act as hubs, while branch offices 62a and 62b act as spokes in that network traffic flows through one of the hubs. In a particular implementation, access to remote hosts associated with other domains is provided through a hub. Other network topologies such as full mesh topologies are also possible.

As FIG. 1 illustrates, network devices 30, in one implementation, are deployed at the respective edges of networks 40a and 40b. In a particular implementation, network devices 30 are network application traffic management devices operative to manage network application traffic in the inbound and outbound directions. Network application traffic management devices 30 may include a number of different functional modules, such as compression modules, tunneling modules, rate control modules, gateway modules, protocol acceleration modules, and the like. As FIG. 1 shows, branch office 62b also includes a network application traffic management device 30d, while branch office 62a does not. Particular implementations of the invention allow for the management of bandwidth across the access link 21c of branch office 62a even though no network application traffic management device has been deployed there. Access link 21c has a maximum bandwidth capacity that depends on the access equipment utilized. For didactic purposes, access link 21c may have a maximum bandwidth capacity of 3 Megabits per second (Mbps); of course, the present invention can be used in connection with access links having different capacities, such as 1.5 Mbps. In particular implementations network application traffic management devices 30a and 30b at data centers 60a and 60b coordinate to manage network traffic at remote branch office 62a.

A.1. Example Network Device Architecture

Figure 6:
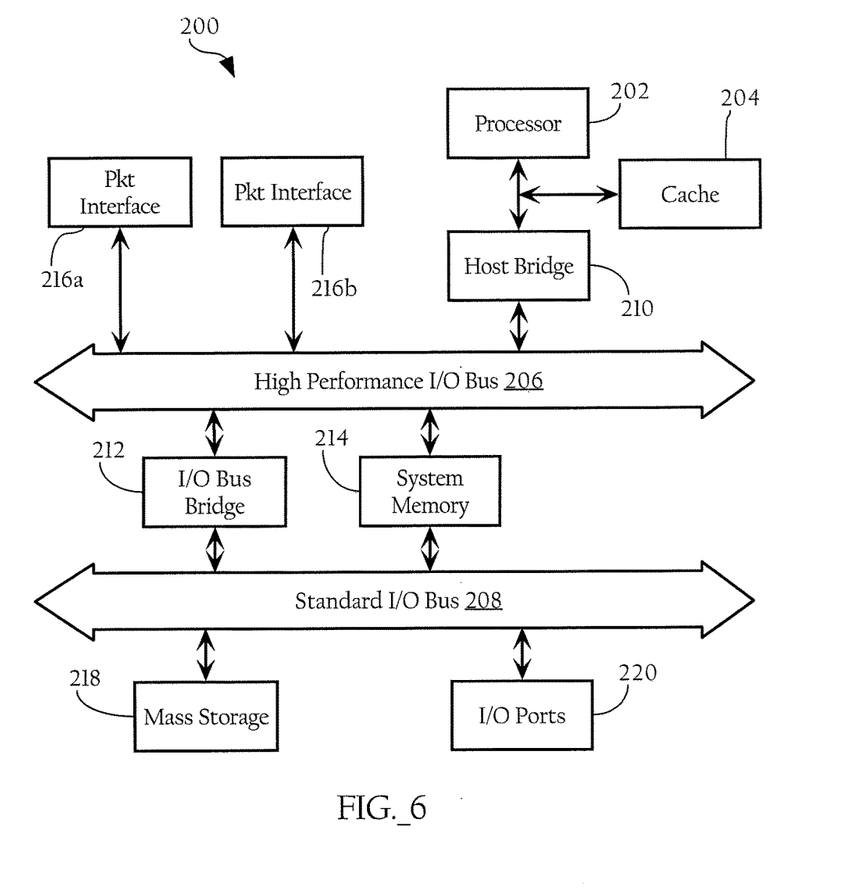
FIG. 6 is a block diagram illustrating an example computing system architecture for a network application traffic management device.

While network application traffic management device 30 may be implemented in a number of different hardware architectures, some or all of the elements or operations thereof may be implemented using a computing system having a general purpose hardware architecture 200 such as the one in FIG. 6. In one implementation, network application traffic management device 30 comprises a processor 202, a cache memory 204, and one or more software applications and drivers directed to the functions described herein. In one implementation, network application traffic management unit 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Mass storage 218 and I/O ports 220 couple to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

As FIG. 6 illustrates, network application traffic management device 30 may comprise network interfaces 216a and 216b. In one implementation, network interfaces comprise Ethernet interfaces including MAC layer functionality. However, other network interfaces can be used depending on the network environment. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to network application traffic management unit 200.

Network application traffic management unit 200 may include a variety of system architectures; and various components of network application traffic management unit 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of network application traffic management unit 200 being coupled to the single bus. Furthermore, network application traffic management unit 200 may include additional components, such as additional processors or processor cores, storage devices, or memories.

The operations of the network application traffic management device 30 described herein are implemented as a series of software routines hosted by network application traffic management device 30. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216a or 216b. The instructions are copied from the storage device, such as mass storage 218, into memory 214 and then accessed and executed by processor 202.

An operating system manages and controls the operation of network application traffic management unit 200, including the input and output of data to and from software applications (not shown). The operating system provides an interface between the software applications being executed on the system and the hardware components of the system. According to one embodiment of the present invention, the operating system is a real-time operating system, such as PSOS, or LINUX. In other implementations, the operating system may be the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, and the like.

A variety of other architectures are possible. For example, the network application traffic management device 30 may include network processing units or other acceleration hardware that is adapted to processing network packets. In addition, network application traffic management device 30 may include application specific integrated circuits, as well.

A.2. Partitions

Figure 2:
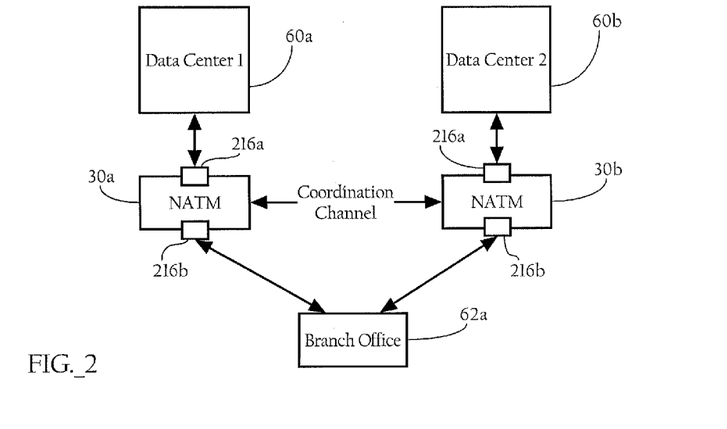
FIG. 2 is a logical block diagram illustrating the flow of data between a branch office and two data centers, as well as a coordination channel between two network application traffic management devices.

FIG. 2 is a logical block diagram illustrating how network application traffic management devices 30*a* and 30*b* deployed at data centers 60*a* and 60*b* coordinate to manage bandwidth utilization at branch office 62*a*. Generally, network application traffic management device 30*a* receives outbound network packets from data center 60*a*, for example, at a first network interface 216*a*, processes the network packets, and transmits the network packets from a second network interface 216*b*. Conversely, inbound network packets are received at the second network interface 216*b*, and transmitted to data center 60*a* from the first network interface 216*a*. Network application traffic management devices 30*a* and 30*b* include functionality that buffers received network packets in a memory, and classifies the packets in order to identify a partition for the packets. Network application traffic management devices 30*a* and 30*b* also include a partitioning module that effectively allocates bandwidth to different network traffic types.

A partition operates to manage bandwidth for aggregate data flows associated with the partition. A partition can be thought of essentially as a division of the capacity of an access link, such as access link 21*c*. For example, a partition may simply be a grouping of data flows for purposes of associating the data flows with a partition queue of a plurality of partition queues. A scheduling mechanism enforces bandwidth controls associated with the partitions by arbitrating among the queues and scheduling buffered packets for output in a manner that achieves guaranteed minimum rates and maximum rates.

Figure 3:
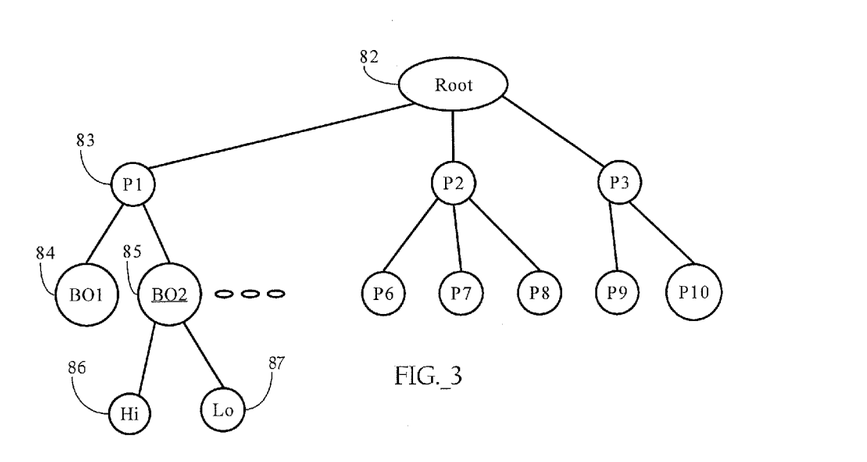
FIG. 3 illustrates a portion of an example hierarchical partition configuration for network bandwidth.

Partitions can be arranged in a hierarchy—that is, partitions can have child and parent partitions (see FIG. 3). For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across a particular access link. These partitions are then sub-dividable to form a hierarchical tree.

In one embodiment, a partition can be created by configuring one or more rules that define what data flow types should be associated with a partition, configuring one or more bandwidth utilization controls, and adding the partition to a desired logical location within a partition configuration hierarchy. In particular implementations, configurable partition parameters include a minimum partition size (guaranteed bandwidth) (in bits per second), and a maximum bandwidth limit. FIG. 3 illustrates, for didactic purposes, an example partition configuration for network application traffic management device 30*a* and/or 30*b* deployed at data center 60*a* and/or data center 60*b*. Network application traffic management devices 30*a* and 30*b* need not share the same overall partition configuration; rather, each of the devices need only have a partition configuration that includes one or more nodes for a branch office 62*a*. The illustrated partition configuration can be applied to data flows in both the inbound and outbound direction. As FIG. 3 illustrates, root partition node 82 represents the available bandwidth capacity of access link 21*a* or 21*b*. Partition P1 83 represents an allocation of the root node 82 for inbound/outbound network traffic corresponding to the branch offices of a given administrative domain. This first level allocation can be further divided among the branch offices that include branch office 62*a* (represented by BO2 node 85) and branch office 62*b* (represented by BO1 node 84). As FIG. 3 also shows, additional rules can be configured to further divide bandwidth allocated to a given branch office node between high priority traffic, medium priority traffic and low priority traffic. In the implementation shown, there partition configuration hierarchy includes a high priority (Hi) partition node 86 and a low priority (Lo) partition node 87. In a particular implementation, data flows that do not meet the rules configured for the high priority (Hi) partition node 86 and the low priority (Lo) partition node 87 are associated with the parent branch office partition node 85 as medium priority traffic.

The partition hierarchy illustrated in FIG. 3 can be created by a network administrator using a network management system or console that provides a global view of the network domain. Using such a configuration tool, the network administrator can create partition nodes representing the various data centers and branch office sites of the administrative domain and allocate bandwidth among them. The resulting partition hierarchy can then be pushed to one or more network application traffic management devices 30 deployed at data center 60*a* and/or data center 60*b*. In other implementations, a different overall partition hierarchy, which includes nodes for each of the branch offices, can be pushed to the network application traffic management devices 30*a* and 30*b* deployed at data center 60*a* and data center 60*b*.

As discussed above, in the didactic example network environment illustrated in FIG. 1, branch office 62*b* includes a network application traffic management device 30*d*, while branch office 62*a* does not. Despite the absence of a network application traffic management device 30 at branch office 62*a*, the network application traffic management devices 30*a* and 30*b* deployed at data centers 60*a* and 60*b* can be configured to control and manage bandwidth at access link 21*c*. Any suitable algorithms and mechanisms can be used to enforce the partitions defined above. With reference to FIG. 2, in the outbound direction from data center 60*a* or 60*b* to branch office 62*b*, network application traffic management devices 30*a* and 30*b* may apply class-based queuing algorithms, weighted class-based queuing algorithms, leaky bucket algorithms, and token bucket algorithms to control the transmission of data packets to branch office 62*a*. That is, network application traffic management devices 30*a* and 30*b* can directly influence bandwidth utilization across access link 21*c* in the outbound direction by controlling the amount of data transmitted to branch office 62*a*. Furthermore, the rate of network traffic in the inbound direction from branch office 62*a* to either of data centers 60*a* and 60*b* may also be controlled using one to several different techniques depending on the transport and other protocols employed. For example, for TCP and similar traffic, the inbound TCP rate control functionality disclosed in U.S. Pat. No. 6,038,216, which is incorporated by reference herein, can be used to control the rate of inbound traffic. The rates assigned to the individual data flows associated with a given partition can be controlled to maintain the aggregate bandwidth allocated to that partition. For example, the aggregate bandwidth associated with a partition can be evenly distributed across the data flows falling within the partition. For UDP traffic, flow admission decisions during detection of signaling traffic can be employed to limit the flow of inbound traffic. For example, network application traffic management device 30 may drop or delay SIP invites transmitted from branch office 62a based on current utilization of access link 21c. Other session or application layer protocol messages can be delayed or dropped to effect data flow rates.

Without some coordination mechanism between data centers 60a and 60b, the capacity of access link 21c could nevertheless be exceeded if the aggregate bandwidth of the combined network traffic transmitted from data centers 60a and 60b exceeds the capacity of access link 21c. Similar conditions may occur in the opposite direction if the inbound rate control mechanisms implemented at the network application traffic management devices 30a and 30b allowed the inbound rates to grow to exceed the capacity of access link 21c. Furthermore, while the partitions configured at data centers 60a and 60b could each be limited to statically divide the capacity of access link 21c, this configuration would be inefficient as it would often result in underutilization of the access link.

To facilitate bandwidth management at branch office 62a, a network administrator may configure the partition node 85 corresponding to branch office 62a as a coordinated partition node. In other implementations, a network management system, having information as to the deployment of network devices across an administrative domain, may automatically configure the partition node 85 as a coordinated partition node since no traffic management device has been deployed on access link 21c. The network management system with knowledge of the network topology may also determine which network application traffic management devices 30 (here, 30a and 30b) are to coordinate with each other and automatically push this configuration to the identified network devices. As discussed in more detail below (and as graphically illustrated in FIG. 2), network application traffic management devices 30a and 30b at data centers 60a and 60b exchange bandwidth consumption information over a coordination channel, and dynamically compute local bandwidth limits for the partition to achieve more efficient bandwidth management schemes across access link 21c without deployment of a network device at that link.

B. Partition Coordination

A coordinated partition node, in a particular implementation, is configured with two additional parameters beyond a regular partition—namely, the bandwidth capacity of the access link and a host list containing the network addresses of one or more network application traffic management devices 30. The partition code modules of the network application traffic management devices 30 are operative to maintain network statistics for each of the partitions including the number of bytes transmitted or received. Periodically, each of the network application traffic management devices 30 include bandwidth management coordination code modules that are operative to send messages to other network application traffic management devices 30 on the host list including bandwidth consumption information for a coordinated partition identified in the message. In other implementations, each network application traffic management device 30 is configured with a global host list of partner network application traffic management devices. In such an implementation, a given network application traffic management device transmits messages regarding bandwidth consumption information for coordinated partitions to all partner devices on the host list, regardless of whether a given remote partner device is configured with the same coordinated partition. In such an implementation, a partner network device, receiving a message including bandwidth consumption information, ignores the portions of the message that do not correspond to the coordinated partitions in its own local configuration.

In a particular implementation, the bandwidth consumption information is a counter value, a direction indicator, and a time stamp. The direction indicator identifies the direction of the network traffic—i.e., inbound or outbound. The counter value indicates the bytes received (inbound) or transmitted (outbound) that correspond to the coordinated partition. The time stamp is a value that identifies or maps to the time the counter value was generated. Partner network application traffic management devices 30 can use a time synchronization mechanism to facilitate the use of time stamps. Rates can be computed by subtracting newly received byte count information from the previous value and dividing by the time difference between the new and previous time stamps. In other implementations, the arrival time of the message could be used in lieu of the time stamps. In either implementation, the time stamps could also be used in connection with replay protection mechanisms. In a particular implementation, the byte count messages may be User Datagram Protocol (UDP) messages. Of course, any suitable protocol can be used. The byte count messages may also include security measures, such as encryption, digital signatures (e.g., MD5 hashes) and replay protection counters to guard against possible attacks. In other implementations, locally computed rates can be exchanged between network application traffic management devices 30.

Figure 4:
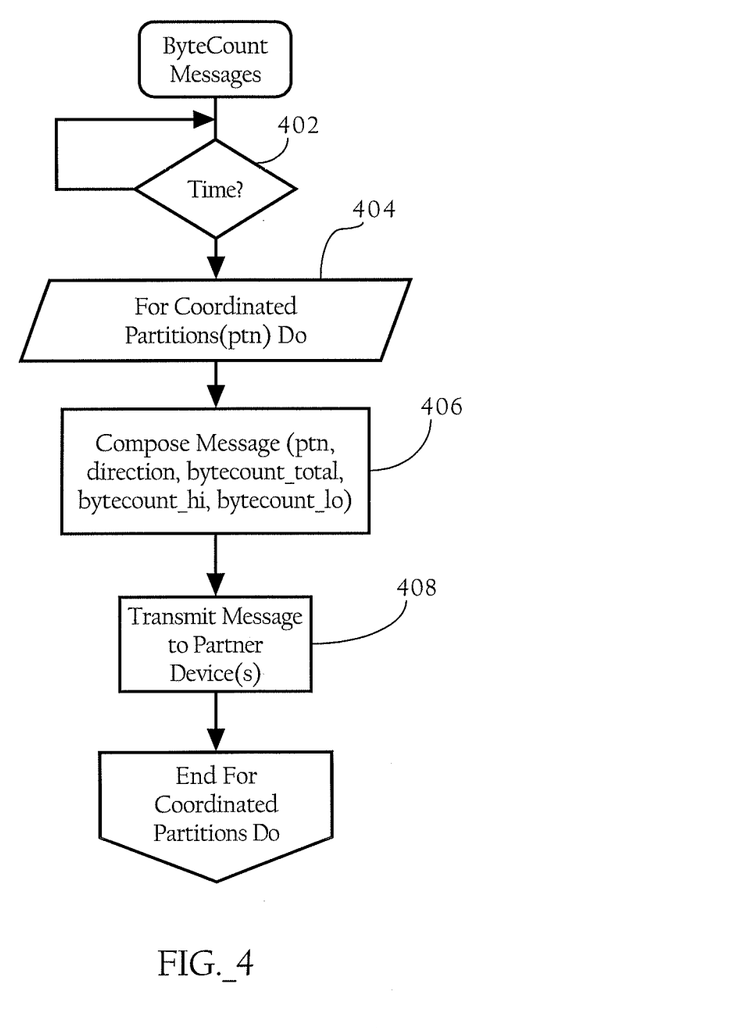
FIGS. 4 and 5 are flow charts illustrating example methods according to particular implementations of the invention.

FIG. 4 illustrates an example method, according to one possible implementation, directed to transmitting byte count messages to partner network application traffic management devices 30 for one or more coordinated partitions. In the implementation shown, a byte count message process or thread operates at periodic intervals (402) to generate byte count messages. As FIG. 4 illustrates, the byte count message process, for each coordinated partition (404), accesses a byte counter for the coordinate partition and selected direction and composes a byte count message (406). Alternatively, byte count information for both directions can be included in the message. In a particular implementation, the byte count message identifies the partition either by a name or some index value that maps to a partition, includes a time stamp, a direction indicator, and one or more byte count values. In one implementation, the byte count values include a total byte count value (total_bytecount), as well as byte count values associated with a Hi (bytecount_hi) and/or Lo (bytecount_lo) child partition (if any) associated with the coordinated partition. The byte count message process then transmits the byte count message to one or more partner network application traffic management devices 30 either associated with the coordinated partition or a global host list (408). Upon receipt of a byte count message, the byte count data of the coordinated partition in one or both directions can be updated accordingly.

Figure 5:
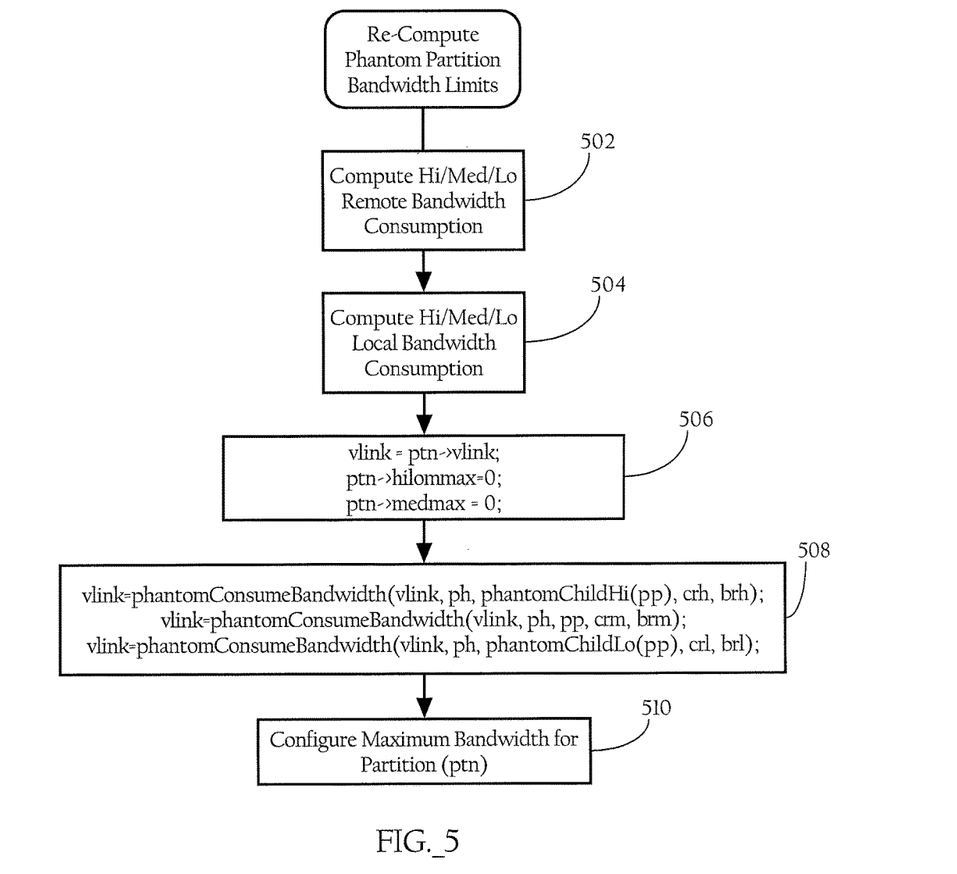

As FIG. 5 illustrates, the network application traffic management devices 30 that exchange bandwidth consumption information can adjust the locally configured bandwidth limits on coordinated partitions. FIG. 5 illustrates a process or function for re-computing the maximum bandwidth limit locally applied by a given network application traffic management device 30 (such as devices 30a and 30b). The illustrated process or function can be called performed on a periodic basis (e.g., every 5 seconds) for a coordinated partition, or can respond to the receipt of one or more byte count messages received from partner network application traffic management devices 30.

As FIG. 5 illustrates, a partition update process, when invoked, may access bandwidth consumption information for the coordinated partition to compute both the locally observed and remote bandwidth consumption for a given direction of network traffic (502, 504). In the implementation shown the partition update process computes an exponential weighted moving average of the remotely observed rate, and an exponential weighted moving average of the locally observed rate. The observed rate over a given interval can be computed by computing the byte count difference between time stamps and dividing between the time difference of the time stamps. In the implementation shown, local and remote rates for the high, low and medium priority traffic of the coordinated partition are computed. In one implementation, the rates for medium priority traffic may be computed by subtracting the high and low rates from the total rate. The following pseudo code illustrates one possible function implementation for computing local and remote rates:

```
    void
phantomReCalculate(
    PartitionPtr         pp      //partition pointer
){
    PhantomPartitionPtr  ph;     //internal partition pointer
    PhantomBranchPtr     pb;     //office branch parameters
    int                  i;
    BPS                  crh, crl, crm;
    BPS                  brh, brl, brm;
    BPS                  t, h, l;
    BPS                  vlink;
    BW_PROGRAM           prog;
```

As the foregoing illustrates, a phantomReCalculate function receives as a parameter a pointer to an identified partition and utilizes the internal variables set forth above. The pb value points to a data structure that stores attributes of the branch office and the coordinated partition, such as the identity of the partner network application traffic management devices 30 and the observed byte counts contained in the byte count messages.

```
ph = pp->phantom;
//Initialize variables
brh = brl = brm = 0;
//Compute Aggregate Remote Bandwidth Consumption
    //brh = aggregate remote high priority rate;
    //brm = aggregate remote medium priority rate;
    //brl = aggregate remote low priority rate;
for(i = 0; i < kPartnerCount; i++){
    pb = &ph->partners[i];
    if(pb->partner){
        t = ewmaReadFast(&pb->total.rate);
        h = ewmaReadFast(&pb->hi.rate);
        l = ewmaReadFast(&pb->lo.rate);
        brh += h;
        brl += l;
        brm += (t - h - l);
    }
}
if(((INT32)brm) < 0)
    brm = 0;
//Compute Local Bandwidth Consumption
    //crh = local high priority rate;
    //crm = local medium priority rate;
    //crl = local low priority rate;
crh = ewmaReadFast(&ph->hi.rate);
crl = ewmaReadFast(&ph->lo.rate);
crm = ewmaReadFast(&ph->total.rate) - crh - crl;
if(((INT32)crm) < 0)
    crm = 0;
```

The function ewmaReadFast returns the exponential weighted moving average of the observed rate based on the data provided in the byte count messages discussed above. Other smoothing functions, such as weighted moving averages, can also be used.

The partition update process then initialize one or more additional variables (506), setting a vlink variable to the capacity of the access link (ph→vlink), and the allocation variables (ph→hilomax and ph→medmax) to zero.

```
vlink = ph->vlink;
ph->hilomax = 0;
ph->medmax = 0;
```

The partition update process then calls a phantomConsumeBandwith function three times to compute bandwidth limits for high, medium and low priority traffic for the coordinated partition (508).

```
vlink = phantomConsumeBandwidth(vlink, ph, phantomChildHigh(pp), crh, brh);
vlink = phantomConsumeBandwidth(vlink, ph, pp, crm, brm);
vlink = phantomConsumeBandwidth(vlink, ph, phantomChildLow(pp), crl, brl);
```

The functions phantomChildHigh and phantomChildLow return pointers to the high and low priority child partitions of the coordinated partition (pp), if any exist. If no such child partitions exist locally, a zero or null value is returned. The following pseudocode provides an example phantomConsumeBandwidth function:

```
phantomConsumeBandwidth(
    BPS                  vlink,
    PhantomPartitionPtr  ph,
    PartitionPtr         pp,
    BPS                  crv,
    BPS                  brv
){
    BPS                  trate, grate, mrate, pmax, amax, target;
    BW_PROGRAM           prog;
    //if no local high/low partition, then subtract brv from vlink
    if(!pp)
        return(vlink - brv);
    //determine aggregate observed rate
    trate = crv + brv;
    //compute new aggregate rate
    grate = phantomAdjustRate(vlink, trate);
    //determine local rate
    target = grate - brv;
    prog = *bwpGetProgram(pp);
    //smooth out rate by averaging against current maximum rate
    mrate = (prog.maxBwidth + target) / 2;
    amax = ph->hilomax + ph->medmax;
    pmax = pp->cfgMax - amax;
    //maintain mrate between minimum (minBwidth) and
    //maximum (cfgMax) administratively configured values
    if(mrate > pmax)
        mrate = pmax;
    else if(mrate < prog.minBwidth)
        mrate = prog.minBwidth;
    //saves medium rate allocation for later configuration
    //after low and high rates are configured
    if(pp->phantom)
        ph->medmax = mrate;
    else{
        prog.maxBwidth = mrate;
        ptnResizePriv(pp, &prog, FALSE);
        ph->hilomax += mrate;
    }
}
```

```
        //vlink reduced by trate for successive iterations
        return(vlink - trate);
    }
    BPS
phantomAdjustRate(
    BPS            vlink,
    BPS            trate
){
    if(trate > ((95 * vlink) / 100))
        return((98 * trate) / 100);
    else if(trate < ((50 * vlink) / 100))
        return((51 * vlink) / 100);
    else if(trate < ((90 * vlink) / 100))
        return((102 * trate) / 100);
    return(trate);
}
```

As the foregoing illustrates, the phantomAdjustRate function adjusts the aggregate rate given the currently observed aggregate rate and the link rate capacity or remaining portion of the link capacity (vlink). In the implementation shown, if the current aggregate rate is greater than 95 percent of the link capacity or remaining portion of the link capacity (vlink), the function decreases the rate slightly, setting it (in this implementation) to 98 percent of the currently observed aggregate rate. If the total observed aggregate rate is less than 50 percent of the link capacity, the function sets the rate to 51 percent of the link capacity. If the total observed rate is less than 90 percent of the link capacity (and in this example greater than 50 percent of the link capacity), the function allows the aggregate rate to grow to 102 percent of the currently observed rate. Furthermore, if the currently observed rate does not meet any of the above-defined limitations, the aggregate rate is not adjusted. One skilled in the art will recognize that the threshold percentages set forth above can be adjusted based on a variety of engineering and design considerations.

The phantomConsumeBandwidth function uses this new aggregate rate to compute a new local rate (target) for the partition by in part subtracting the newly computed rate (grate) from the remotely observed rates (brv). In the implementation shown, the local rate that is actually configured may be smoothed (by averaging with the currently configured rate limit (prog.maxBwidth). In addition, other checks may be performed to ensure that the configured rate is within administratively configured maximums and minimums (if any).

Returning to FIG. 5, the partition update process then sets the maximum bandwidth limits for the coordinated partition (510). The partitioning mechanism of each network application traffic management device 30 then applies these bandwidth limits as discussed above to control the rate of aggregate inbound or outbound network traffic from/to the branch office 62a.

As the foregoing illustrates, the phantomConsumeBandwidth function iteratively computes bandwidth limits taking account of locally and remotely observed bandwidth utilization for low, medium and high traffic. Assuming observed bandwidth utilization in the high and medium classes, each iteration of the phantomConsumeBandwidth function operates on the remaining, unallocated bandwidth corresponding to the branch office 62a. Accordingly, the phantomConsumeBandwidth function and phantomAdjustRate functions may behave differently with each iteration given that each iteration may operate with lower link capacity (vlink) values. For example, the results of the functions may result in increasing rates for high priority traffic, while decreasing rates for low priority traffic. The same functions set forth above are applied locally at each network application traffic management device 30a and 30b; however, complementary local limits are generated across all partner network application traffic management devices 30 to achieve a bandwidth management scheme such that maximum bandwidth limits of the coordinated partitions, when aggregated, are less likely to exceed the capacity of the access link 21c while also being flexible and dynamic to adapt to actually observed conditions.

Particular embodiments of the above-described process might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the process described above and many possible modularizations of those orderings. Further, in embodiments where processing speed is not determinative, the process might run in the control plane rather than the data plane. As a result, the invention is not limited to the specific examples and illustrations discussed above, but only by the following claims and their equivalents.

What is claimed is:
1. An apparatus comprising
one or more processors;
a computer-readable medium, comprising computer-readable instructions operative, when loaded and executed, to cause the one or more processors to:
partition network bandwidth across a plurality of partitions, wherein:
   a local partition corresponds to a coordinated partition of a node of a remote network site, the remote network site in communication with the apparatus via a wide area network; and
   the coordinated partition is associated with coordinated partition configuration information that:
      identifies a maximum bandwidth limit for the node of the remote network site;
      includes a local maximum bandwidth configuration comprising a local maximum bandwidth limit; and
      includes a host list identifying one or more network application traffic management devices at respective remote locations across the wide area network;
exchange bandwidth consumption data for the coordinated partition with the one or more network application traffic management devices identified in the host list; and
adjust, for the coordinated partition, the local maximum bandwidth configuration based on the maximum bandwidth limit for the node of the remote network site and on observed local and remote bandwidth consumption of the coordinated partition.

2. The apparatus of claim 1 wherein the bandwidth consumption data comprises a byte count value.

3. The apparatus of claim 1 wherein the medium further comprises instructions operative to cause the processors to:
compute an aggregate observed rate across the network application traffic management devices for the coordinated partition based on the exchanged bandwidth consumption data;
determine a new target aggregate rate for the coordinated partition; and
determine the local maximum bandwidth configuration based on the new target aggregate rate and a remote aggregate rate observed across the network application traffic management devices.

4. The apparatus of claim 1 wherein the medium further comprises instructions operative to cause the processors to:
compute an aggregate observed rate across the network application traffic management devices for the coordinated partition based on the exchanged bandwidth consumption data;
determine a new target aggregate rate for the coordinated partition by comparing the aggregate observed rate to the maximum bandwidth limit of the node of the remote network site relative to one or more threshold values to conditionally increase or decrease the new target aggregate rate; and
determine the local maximum bandwidth configuration based on the new target aggregate rate and a remote aggregate rate observed across the network application traffic management devices.

5. The apparatus of claim 1 wherein the medium further comprises instructions operative to cause the processors to:
compute an aggregate observed rate across the network application traffic management devices for the coordinated partition based on the exchanged bandwidth consumption data;
determine a new target aggregate rate for the coordinated partition by comparing the aggregate observed rate to the maximum bandwidth limit of the node of the remote network site relative to a threshold value to conditionally increase or decrease the new target aggregate rate;
based on a determination that the aggregate observed rate is greater than a threshold percentage of the maximum bandwidth limit for the node of the remote network site, set the new target aggregate rate to a fraction of the aggregate observed rate; and
determine the local maximum bandwidth configuration based on the new target aggregate rate and a remote aggregate rate observed across the network application traffic management devices.

6. The apparatus of claim 1 wherein the medium further comprises instructions operative to cause the processors to:
compute an aggregate observed rate across the network application traffic management devices for the coordinated partition based on the exchanged bandwidth consumption data;
determine a new target aggregate rate for the coordinated partition by comparing the aggregate observed rate to the maximum bandwidth limit of the node of the remote network site relative to one or more threshold values to conditionally increase or decrease the new target aggregate rate;
based on a determination that the aggregate observed rate is less than a threshold percentage of the maximum bandwidth limit for the node of the remote network site, set the new target aggregate rate to a fraction of the maximum bandwidth limit for the node of the remote network site; and
determine the local maximum bandwidth configuration based on the new target aggregate rate and a remote aggregate rate observed across the network application traffic management devices.

7. The apparatus of claim 1 wherein the medium further comprises instructions operative to cause the processors to:
compute an aggregate observed rate across the network application traffic management devices for the coordinated partition based on the exchanged bandwidth consumption data;
determine a new target aggregate rate for the coordinated partition by comparing the aggregate observed rate to the maximum bandwidth limit of the node of the remote network site relative to one or more threshold values to conditionally increase or decrease the new target aggregate rate;
based on a determination that the aggregate observed rate is less than a first threshold percentage, and greater than second threshold percentage, of the maximum bandwidth limit for the node of the remote network site, set the new target aggregate rate to a sum of the aggregate observed rate and a fraction of the aggregate observed rate; and
determine the local maximum bandwidth configuration based on the new target aggregate rate and a remote aggregate rate observed across the network application traffic management devices.

8. The apparatus of claim 1 wherein medium further comprises instructions operative to cause the one or more processors to:
compute an aggregate observed rate of high priority traffic across the one or more network application traffic management devices for the coordinated partition based on the exchanged bandwidth consumption data;
determine a new target aggregate rate for high priority traffic of the coordinated partition based on the aggregate observed rate and the maximum bandwidth limit of the node of the remote network site; and
determine the local maximum bandwidth configuration for the high priority traffic based on the new target aggregate rate and the remote aggregate rate of high priority traffic observed across the one or more network application traffic management devices.

9. The apparatus of claim 1 wherein the bandwidth management coordination code further comprises instructions operative to cause the one or more processors to:
compute an aggregate observed rate of high priority traffic across the one or more network application traffic management devices for the coordinated partition based on the exchanged bandwidth consumption data;
determine a new target aggregate rate for high priority traffic of the coordinated partition based on the aggregate observed rate and the maximum bandwidth limit of the node of the remote network site;
determine a local maximum bandwidth configuration for the high priority traffic based on the new target aggregate rate and the remote aggregate rate of high priority traffic observed across the one or more network application traffic management devices;
compute an aggregate observed rate of medium priority traffic across the one or more network application traffic management devices for the coordinated partition based on the exchanged bandwidth consumption data;

determine a new target aggregate rate for medium priority traffic of the coordinated partition based on the aggregate observed rate for medium priority traffic and the maximum bandwidth limit of the node of the remote network site less the aggregate observed rate of high priority traffic across the one or more network application traffic management devices; and determine a local maximum bandwidth configuration for the medium priority traffic based on the new target aggregate rate and the remote aggregate rate of medium priority traffic observed across the one or more network application traffic management devices.

10. The apparatus of claim 1 wherein the bandwidth management coordination code further comprises instructions operative to cause the one or more processors to:

compute an aggregate observed rate of high priority traffic across the one or more network application traffic management devices for the coordinated partition based on the exchanged bandwidth consumption data;

determine a new target aggregate rate for high priority traffic of the coordinated partition based on the aggregate observed rate and the maximum bandwidth limit of the node of the remote network site;

determine a local maximum bandwidth configuration for the high priority traffic based on the new target aggregate rate and the remote aggregate rate of high priority traffic observed across the one or more network application traffic management devices;

compute an aggregate observed rate of medium priority traffic across the one or more network application traffic management devices for the coordinated partition based on the exchanged bandwidth consumption data;

determine a new target aggregate rate for medium priority traffic of the coordinated partition based on the aggregate observed rate for medium priority traffic and the maximum bandwidth limit of the node of the remote network site less the aggregate observed rate of high priority traffic across the one or more network application traffic management devices;

determine a local maximum bandwidth configuration for the medium priority traffic based on the new target aggregate rate and the remote aggregate rate of medium priority traffic observed across the one or more network application traffic management devices;

compute an aggregate observed rate of low priority traffic across the one or more network application traffic management devices for the coordinated partition based on the exchanged bandwidth consumption data;

determine a new target aggregate rate for low priority traffic of the coordinated partition based on the aggregate observed rate for low priority traffic and the maximum bandwidth limit of the node of the remote network site less the aggregate observed rate of high and medium priority traffic across the one or more network application traffic management devices; and determine a local maximum bandwidth configuration for the low priority traffic based on the new target aggregate rate and the remote aggregate rate of low priority traffic observed across the one or more network application traffic management devices.

11. A method for an apparatus, comprising:

partitioning network bandwidth across a plurality of partitions, wherein:

a local partition corresponds to a coordinated partition of a node of a remote network site, the remote network site in communication with the apparatus via a wide area network; and the coordinated partition is associated with coordinated partition configuration information that:

identifies a maximum bandwidth limit for the node of the remote network site;

includes a local maximum bandwidth configuration comprising a local maximum bandwidth limit; and includes a host list identifying one or more network application traffic management devices at respective remote locations across the wide area network;

exchanging bandwidth consumption data for the coordinated partition with the one or more network application traffic management devices identified in the host list; and adjusting, for the coordinated partition, the local maximum bandwidth configuration based on the maximum bandwidth limit for the node of the remote network site and on observed local and remote bandwidth consumption of the coordinated partition.

12. The method of claim 11, wherein the bandwidth consumption data comprises a byte count value.

13. The method of claim 11, wherein the method further comprises:

computing an aggregate observed rate across the network application traffic management devices for the coordinated partition based on the exchanged bandwidth consumption data;

determining a new target aggregate rate for the coordinated partition; and determining the local maximum bandwidth configuration based on the new target aggregate rate and a remote aggregate rate observed across the network application traffic management devices.

14. The method of claim 11, wherein the method further comprises:

computing an aggregate observed rate across the network application traffic management devices for the coordinated partition based on the exchanged bandwidth consumption data;

determining a new target aggregate rate for the coordinated partition by comparing the aggregate observed rate to the maximum bandwidth limit of the node of the remote network site relative to one or more threshold values to conditionally increase or decrease the new target aggregate rate; and determining the local maximum bandwidth configuration based on the new target aggregate rate and a remote aggregate rate observed across the network application traffic management devices.

15. The method of claim 11, wherein the method further comprises:

computing an aggregate observed rate across the network application traffic management devices for the coordinated partition based on the exchanged bandwidth consumption data;

determining a new target aggregate rate for the coordinated partition by comparing the aggregate observed rate to the maximum bandwidth limit of the node of the remote network site relative to a threshold value to conditionally increase or decrease the new target aggregate rate;

based on a determination that the aggregate observed rate is greater than a threshold percentage of the maximum bandwidth limit for the node of the remote network site, setting the new target aggregate rate to a fraction of the aggregate observed rate; and determining the local maximum bandwidth configuration based on the new target aggregate rate and a remote aggregate rate observed across the network application traffic management devices.

16. The method of claim 11, wherein the method further comprises:
computing an aggregate observed rate across the network application traffic management devices for the coordinated partition based on the exchanged bandwidth consumption data;
determining a new target aggregate rate for the coordinated partition by comparing the aggregate observed rate to the maximum bandwidth limit of the node of the remote network site relative to one or more threshold values to conditionally increase or decrease the new target aggregate rate;
based on a determination that the aggregate observed rate is less than a threshold percentage of the maximum bandwidth limit for the node of the remote network site, setting the new target aggregate rate to a fraction of the maximum bandwidth limit for the node of the remote network site; and
determining the local maximum bandwidth configuration based on the new target aggregate rate and a remote aggregate rate observed across the network application traffic management devices.

17. The method of claim 11, wherein the method further comprises:
computing an aggregate observed rate across the network application traffic management devices for the coordinated partition based on the exchanged bandwidth consumption data;
determining a new target aggregate rate for the coordinated partition by comparing the aggregate observed rate to the maximum bandwidth limit of the node of the remote network site relative to one or more threshold values to conditionally increase or decrease the new target aggregate rate;
based on a determination that the aggregate observed rate is less than a first threshold percentage, and greater than second threshold percentage, of the maximum bandwidth limit for the node of the remote network site, setting the new target aggregate rate to a sum of the aggregate observed rate and a fraction of the aggregate observed rate; and
determining the local maximum bandwidth configuration based on the new target aggregate rate and a remote aggregate rate observed across the network application traffic management devices.

18. The method of claim 11, wherein the method further comprises:
computing an aggregate observed rate of high priority traffic across the one or more network application traffic management devices for the coordinated partition based on the exchanged bandwidth consumption data;
determining a new target aggregate rate for high priority traffic of the coordinated partition based on the aggregate observed rate and the maximum bandwidth limit of the node of the remote network site; and
determining a local maximum bandwidth configuration for the high priority traffic based on the new target aggregate rate and the remote aggregate rate of high priority traffic observed across the one or more network application traffic management devices.

19. The method of claim 11, wherein the method further comprises:
computing an aggregate observed rate of high priority traffic across the one or more network application traffic management devices for the coordinated partition based on the exchanged bandwidth consumption data;
determining a new target aggregate rate for high priority traffic of the coordinated partition based on the aggregate observed rate and the maximum bandwidth limit of the node of the remote network site;
determining a local maximum bandwidth configuration for the high priority traffic based on the new target aggregate rate and the remote aggregate rate of high priority traffic observed across the one or more network application traffic management devices;
computing an aggregate observed rate of medium priority traffic across the one or more network application traffic management devices for the coordinated partition based on the exchanged bandwidth consumption data;
determining a new target aggregate rate for medium priority traffic of the coordinated partition based on the aggregate observed rate for medium priority traffic and the maximum bandwidth limit of the node of the remote network site less the aggregate observed rate of high priority traffic across the one or more network application traffic management devices; and
determining a local maximum bandwidth configuration for the medium priority traffic based on the new target aggregate rate and the remote aggregate rate of medium priority traffic observed across the one or more network application traffic management devices.

20. The method of claim 11, wherein the method further comprises:
computing an aggregate observed rate of high priority traffic across the one or more network application traffic management devices for the coordinated partition based on the exchanged bandwidth consumption data;
determining a new target aggregate rate for high priority traffic of the coordinated partition based on the aggregate observed rate and the maximum bandwidth limit of the node of the remote network site;
determining a local maximum bandwidth configuration for the high priority traffic based on the new target aggregate rate and the remote aggregate rate of high priority traffic observed across the one or more network application traffic management devices;
computing an aggregate observed rate of medium priority traffic across the one or more network application traffic management devices for the coordinated partition based on the exchanged bandwidth consumption data;
determining a new target aggregate rate for medium priority traffic of the coordinated partition based on the aggregate observed rate for medium priority traffic and the maximum bandwidth limit of the node of the remote network site less the aggregate observed rate of high priority traffic across the one or more network application traffic management devices;
determining a local maximum bandwidth configuration for the medium priority traffic based on the new target aggregate rate and the remote aggregate rate of medium priority traffic observed across the one or more network application traffic management devices;
computing an aggregate observed rate of low priority traffic across the one or more network application traffic management devices for the coordinated partition based on the exchanged bandwidth consumption data;
determining a new target aggregate rate for low priority traffic of the coordinated partition based on the aggregate observed rate for low priority traffic and the maximum bandwidth limit of the node of the remote network site less the aggregate observed rate of high and medium priority traffic across the one or more network application traffic management devices; and determining a local maximum bandwidth configuration for the low priority traffic based on the new target aggregate rate and the remote aggregate rate of low priority traffic observed across the one or more network application traffic management devices.

21. A non-transitory computer-readable medium comprising computer-readable instructions operative, when loaded and executed, to cause one or more processors of an apparatus to:

partition network bandwidth across a plurality of partitions, wherein:
- a local partition corresponds to a coordinated partition of a node of a remote network site, the remote network site in communication with the apparatus via a wide area network; and
- the coordinated partition is associated with coordinated partition configuration information that:
  - identifies a maximum bandwidth limit for the node of the remote network site;
  - includes a local maximum bandwidth configuration comprising a local maximum bandwidth limit; and
  - includes a host list identifying one or more network application traffic management devices at respective remote locations across the wide area network;

exchange bandwidth consumption data for the coordinated partition with the one or more network application traffic management devices identified in the host list; and adjust, for the coordinated partition, the local maximum bandwidth configuration based on the maximum bandwidth limit for the node of the remote network site and on observed local and remote bandwidth consumption of the coordinated partition.

22. The medium of claim 21, wherein the bandwidth consumption data comprises a byte count value.

23. The medium of claim 21, further comprising instructions to cause the processors to:
compute an aggregate observed rate across the network application traffic management devices for the coordinated partition based on the exchanged bandwidth consumption data;
determine a new target aggregate rate for the coordinated partition; and
determine the local maximum bandwidth configuration based on the new target aggregate rate and a remote aggregate rate observed across the network application traffic management devices.

24. The medium of claim 21, further comprising instructions to cause the processors to:
compute an aggregate observed rate across the network application traffic management devices for the coordinated partition based on the exchanged bandwidth consumption data;
determine a new target aggregate rate for the coordinated partition by comparing the aggregate observed rate to the maximum bandwidth limit of the node of the remote network site relative to one or more threshold values to conditionally increase or decrease the new target aggregate rate; and
determine the local maximum bandwidth configuration based on the new target aggregate rate and a remote aggregate rate observed across the network application traffic management devices.

25. The medium of claim 21, further comprising instructions to cause the processors to:
compute an aggregate observed rate across the network application traffic management devices for the coordinated partition based on the exchanged bandwidth consumption data;
determine a new target aggregate rate for the coordinated partition by comparing the aggregate observed rate to the maximum bandwidth limit of the node of the remote network site relative to a threshold value to conditionally increase or decrease the new target aggregate rate;
based on a determination that the aggregate observed rate is greater than a threshold percentage of the maximum bandwidth limit for the node of the remote network site, set the new target aggregate rate to a fraction of the aggregate observed rate; and
determine the local maximum bandwidth configuration based on the new target aggregate rate and a remote aggregate rate observed across the network application traffic management devices.

26. The medium of claim 21, further comprising instructions to cause the processors to:
compute an aggregate observed rate across the network application traffic management devices for the coordinated partition based on the exchanged bandwidth consumption data;
determine a new target aggregate rate for the coordinated partition by comparing the aggregate observed rate to the maximum bandwidth limit of the node of the remote network site relative to one or more threshold values to conditionally increase or decrease the new target aggregate rate;
based on a determination that the aggregate observed rate is less than a threshold percentage of the maximum bandwidth limit for the node of the remote network site, set the new target aggregate rate to a fraction of the maximum bandwidth limit for the node of the remote network site; and
determine the local maximum bandwidth configuration based on the new target aggregate rate and a remote aggregate rate observed across the network application traffic management devices.

27. The medium of claim 21, further comprising instructions to cause the processors to:
compute an aggregate observed rate across the network application traffic management devices for the coordinated partition based on the exchanged bandwidth consumption data;
determine a new target aggregate rate for the coordinated partition by comparing the aggregate observed rate to the maximum bandwidth limit of the node of the remote network site relative to one or more threshold values to conditionally increase or decrease the new target aggregate rate;
based on a determination that the aggregate observed rate is less than a first threshold percentage, and greater than second threshold percentage, of the maximum bandwidth limit for the node of the remote network site, set the new target aggregate rate to a sum of the aggregate observed rate and a fraction of the aggregate observed rate; and
determine the local maximum bandwidth configuration based on the new target aggregate rate and a remote aggregate rate observed across the network application traffic management devices.

28. The medium of claim 21, further comprising instructions to cause the processors to:
   compute an aggregate observed rate of high priority traffic across the one or more network application traffic management devices for the coordinated partition based on the exchanged bandwidth consumption data;
   determine a new target aggregate rate for high priority traffic of the coordinated partition based on the aggregate observed rate and the maximum bandwidth limit of the node of the remote network site; and
   determine a local maximum bandwidth configuration for the high priority traffic based on the new target aggregate rate and the remote aggregate rate of high priority traffic observed across the one or more network application traffic management devices.

29. The medium of claim 21, further comprising instructions to cause the processors to:
   compute an aggregate observed rate of high priority traffic across the one or more network application traffic management devices for the coordinated partition based on the exchanged bandwidth consumption data;
   determine a new target aggregate rate for high priority traffic of the coordinated partition based on the aggregate observed rate and the maximum bandwidth limit of the node of the remote network site;
   determine a local maximum bandwidth configuration for the high priority traffic based on the new target aggregate rate and the remote aggregate rate of high priority traffic observed across the one or more network application traffic management devices;
   compute an aggregate observed rate of medium priority traffic across the one or more network application traffic management devices for the coordinated partition based on the exchanged bandwidth consumption data;
   determine a new target aggregate rate for medium priority traffic of the coordinated partition based on the aggregate observed rate for medium priority traffic and the maximum bandwidth limit of the node of the remote network site less the aggregate observed rate of high priority traffic across the one or more network application traffic management devices; and
   determine a local maximum bandwidth configuration for the medium priority traffic based on the new target aggregate rate and the remote aggregate rate of medium priority traffic observed across the one or more network application traffic management devices.

30. The medium of claim 21, further comprising instructions to cause the processors to:
   compute an aggregate observed rate of high priority traffic across the one or more network application traffic management devices for the coordinated partition based on the exchanged bandwidth consumption data;
   determine a new target aggregate rate for high priority traffic of the coordinated partition based on the aggregate observed rate and the maximum bandwidth limit of the node of the remote network site;
   determine a local maximum bandwidth configuration for the high priority traffic based on the new target aggregate rate and the remote aggregate rate of high priority traffic observed across the one or more network application traffic management devices;
   compute an aggregate observed rate of medium priority traffic across the one or more network application traffic management devices for the coordinated partition based on the exchanged bandwidth consumption data;
   determine a new target aggregate rate for medium priority traffic of the coordinated partition based on the aggregate observed rate for medium priority traffic and the maximum bandwidth limit of the node of the remote network site less the aggregate observed rate of high priority traffic across the one or more network application traffic management devices;
   determine a local maximum bandwidth configuration for the medium priority traffic based on the new target aggregate rate and the remote aggregate rate of medium priority traffic observed across the one or more network application traffic management devices;
   compute an aggregate observed rate of low priority traffic across the one or more network application traffic management devices for the coordinated partition based on the exchanged bandwidth consumption data;
   determine a new target aggregate rate for low priority traffic of the coordinated partition based on the aggregate observed rate for low priority traffic and the maximum bandwidth limit of the node of the remote network site less the aggregate observed rate of high and medium priority traffic across the one or more network application traffic management devices; and
   determine a local maximum bandwidth configuration for the low priority traffic based on the new target aggregate rate and the remote aggregate rate of low priority traffic observed across the one or more network application traffic management devices.

* * * * *